United States Patent
Brown et al.

(10) Patent No.: US 9,858,031 B2
(45) Date of Patent: Jan. 2, 2018

(54) COLONY DESKTOP HIVE DISPLAY: CREATING AN EXTENDED DESKTOP DISPLAY FROM MULTIPLE MOBILE DEVICES USING NEAR-FIELD OR OTHER NETWORKING

(71) Applicant: International Business Machines Corporation, Armonk, NY (US)

(72) Inventors: Douglas S. Brown, Charlotte, NC (US); John F. Kelley, Clarkesville, GA (US); Todd Seager, Orem, UT (US); Robert J. Torres, Colleyville, TX (US)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 13/792,420

(22) Filed: Mar. 11, 2013

(65) Prior Publication Data
US 2014/0253417 A1 Sep. 11, 2014

(51) Int. Cl.
*G06F 3/14* (2006.01)

(52) U.S. Cl.
CPC .......... *G06F 3/1454* (2013.01); *G06F 3/1446* (2013.01); *G09G 2354/00* (2013.01); *G09G 2356/00* (2013.01); *G09G 2370/16* (2013.01)

(58) Field of Classification Search
CPC ....................................................... G06F 3/14
USPC ................................................... 345/1.1–3.4
See application file for complete search history.

(56) References Cited

U.S. PATENT DOCUMENTS

| | | | |
|---|---|---|---|
| 7,184,718 B2 | 2/2007 | Newman et al. | |
| 2003/0189529 A1* | 10/2003 | Martinez et al. | 345/1.3 |
| 2005/0168399 A1* | 8/2005 | Palmquist | G06F 1/1601 345/1.1 |
| 2008/0216125 A1 | 9/2008 | Li et al. | |
| 2010/0053164 A1* | 3/2010 | Imai et al. | 345/427 |
| 2011/0070826 A1* | 3/2011 | Griffin | H04B 5/02 455/41.1 |
| 2011/0163944 A1* | 7/2011 | Bilbrey | G01D 21/02 345/156 |
| 2011/0294426 A1* | 12/2011 | Matsubara | H04N 7/141 455/41.2 |

OTHER PUBLICATIONS

MobiUS: Enable Together-Viewing Video Experience across Two Mobile Devices; Guobin Shen, Yanlin Li and Yongguang Zhang; Microsoft Corporation; Publ. Sep. 4, 2008; Filed Feb. 29, 2008; pp. 30-42.

* cited by examiner

*Primary Examiner* — Patrick Edouard
*Assistant Examiner* — Matthew Yeung
(74) *Attorney, Agent, or Firm* — Schmeiser, Olsen & Watts, LLP; John Pivnichny (57) ABSTRACT

Computer-implemented methods, computer program products and computer systems that create a virtual extended display on mobile devices by providing a first device in a first location d at least a second device in a second location, followed by joining together the first and second devices within an aggregation session via a network. Logical data of visual content is shared between the first and second devices, and the viewed output display of the visual content split amongst the first and second device displays within the aggregation session. During the aggregation session, at least one of the devices therein is manipulated by movement or changing device parameters to virtually change the viewed output display of the visual content on the manipulated device.

19 Claims, 8 Drawing Sheets

COLONY DESKTOP HIVE DISPLAY: CREATING AN EXTENDED DESKTOP DISPLAY FROM MULTIPLE MOBILE DEVICES USING NEAR-FIELD OR OTHER NETWORKING

TECHNICAL FIELD

The present invention relates generally to visual display of mobile devices, and more specifically, to extending and/or enhancing the visual display of video and/or pictures across multiple mobile devices via a network.

BACKGROUND

Numerous different types of mobile devices currently exist for both computing and/or communication applications. These mobile computing and/or communication devices are widely accepted and used in everyday life applications ranging from business, research, technology, schooling, networking, leisure, sports, travel, and the like. Generally, each mobile device is equipped with hardware and software that provide the device with a variety of resources and capabilities including wireless networking capabilities, multimedia capabilities (e.g., viewing video, pictorial content, text, documents, etc.), file sharing resources, and the like. The development of these resources and capabilities is continually growing and expanding.

In recent years mobile computing and/or communication devices have been provided with collaborative applications that enable different mobile devices to communicate with one another, and even share information and/or resources. For instance, some collaborative applications allow two or more mobile devices share information back and forth, share computing capacities, and even share video or pictorial content. However, in known collaborative applications the data being shared amongst the mobile devices is generally fixed or static in that the image and/or orientation thereof can not be altered or enhanced. Accordingly, needs continue to exist in the art for improved collaborative application methods, apparatus, and computer program codes for mobile devices.

SUMMARY

According to one embodiment of the present invention, the invention is directed to a computer-implemented method of creating a virtual extended display on mobile devices by providing a first device with a first device display in a first location and at least a second device with a second device display in a second location. The first and second devices are joined together within an aggregation session via a network, and then logical data of visual content is shared between the first and second devices. The viewed output display of the visual content is split amongst the first and second device displays within the aggregation session, and the first or second devices is manipulated during the aggregation session to virtually change the viewed output display of the visual content on the device that is being manipulated.

In other embodiments, the invention is directed to a computer program product for creating a virtual extended display on mobile devices. The computer program product includes a computer readable storage media and a first, second, third and fourth program instructions that are all stored on the computer readable storage media. The first program instructions logically join together within an aggregation session via a network a first device with a first device display in a first location to a second device with a second device display in a second location. The second program instructions share logical data of visual content between the first and second devices. The third program instructions split the viewed output display of the visual content amongst the first and second device displays within the aggregation session. The fourth program instructions manipulate at least one of the first or second devices during the aggregation session to virtually change the viewed output display of the visual content on the device being manipulated.

In still other embodiments, the invention is directed to a computer system that includes a central processing unit (CPU), a computer readable memory, and a computer readable storage media. The computer system also includes a first, second, third and fourth program instructions that are all stored on the computer readable storage media for execution by the CPU via the computer readable memory. The first program instructions logically join together within an aggregation session via a network a first device with a first device display in a first location to a second device with a second device display in a second location. The second program instructions share logical data of visual content between the first and second devices. The third program instructions split the viewed output display of the visual content amongst the first and second device displays within the aggregation session. The fourth program instructions manipulate at least one of the first or second devices during the aggregation session to virtually change the viewed output display of the visual content on the device being manipulated.

BRIEF DESCRIPTION OF THE SEVERAL VIEWS OF THE DRAWINGS

FIGS. 4A-6B show one or more exemplary embodiments of the invention.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION

Reference is made herein to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative. Likewise, reference to "the invention" shall not be construed as a generalization of any inventive subject matter disclosed herein.

With the advancement of computing technologies, collaborative applications have been developed for sharing data, files, resources, etc. amongst one or more mobile computing and/or communication devices. However, currently known collaborative applications provide fixed or static aggregated images and/or visual displays that do not allow a mobile device end-user control the use of his mobile device within the aggregated visual display nor within the formation thereof. That is, rules and processes of known collaborative applications are inflexible, leaving mobile device end-users no control over how their mobile devices are used in the applications, nor do they provide the end-user the ability to modify parameters of his mobile device(s) during the aggregation session.

In accordance with the various embodiments of the invention methods, apparatus and computer program codes are provided that generate an extended desktop visual display amongst multiple mobile devices via a network, while simultaneously allowing each mobile device end-user to control use of his mobile device(s) within and during the aggregation session. In so doing, a mobile device end-user may control features of his mobile device(s) including, but not limited to, the device's positioning with respect to other devices in the aggregation, mobile device configurations, mobile device imaging parameters (e.g., size, dimensions, shape, pixels, etc.), viewing angle within the aggregation, and the like.

It should be appreciated by one skilled in the art that in describing the various embodiments of the present invention herein, terminology may be used for describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, and/or components, but do not preclude the presence or addition of one or more other features, integers, steps, operations, elements, components, and/or groups thereof.

As will also be appreciated by one skilled in the art, embodiments of the invention may be embodied as systems, methods or computer program products. Accordingly, aspects of the invention may take the form of an entirely hardware embodiment, an entirely software embodiment (including firmware, resident software, micro-code, etc.) or an embodiment combining software and hardware that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this application, a computer readable storage medium may be any tangible medium that can contain, store, communicate, propagate, or transport a program for use by or in connection with an instruction execution system, apparatus, or device. Note that the computer usable or computer readable medium could even be paper or another suitable medium upon which the program is printed, as the program can be electronically captured via, for instance, optical scanning of the paper or other medium, then compiled, interpreted, or otherwise processed in a suitable manner, if necessary, and stored in a computer memory.

A computer readable signal medium may include a propagated data signal with computer readable program code embodied therein, for example, in baseband or as part of a carrier wave. This propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computing device (e.g., desktop computer, laptop computer, mobile computing device, etc.), partly on the user's computing device, as a stand-alone software package, partly on the user's computing device and partly on a remote computing device or entirely on the remote computing device or server. In the latter scenario, the remote computing device may be connected to the user's computing device through any type of network, including a local area network (LAN) or a wide area network (WAN), or the connection may be made to an external computing device (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may also be stored in a computer readable medium that can direct a computing device or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computing device or other programmable data processing apparatus to cause a series of operational steps to be performed on the computing device or other programmable apparatus to produce a computer implemented process. The instructions that execute on the computing device or other programmable apparatus provide processes for implementing the functions/acts specified in the flowchart and/or block diagram block or blocks.

It will further be appreciated by one skilled in the art, embodiments of the present invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

In cloud computing a user may access any of the resources that reside in the cloud at any time, and from anywhere across the Internet. In context of the present invention, a user may access applications or related data available in the cloud that allow video and/or audio to be transferred from one window/tab to another window/tab, or from one device to another. For example, the hardware, software, networking, connectivity, services, etc. of the cloud computing environment provide a user with the online service(s) of continuously viewing a video regardless of the window/tab the user is viewing by transferring the video(s) from its original window/tab (e.g., from its original URL) to the window/tab that the user is currently viewing. Cloud computing identifies and locates the video to its exact source code within the source code of the window/tab on which the video resides, copies the source code of the video and uploads it to a window/tab that is currently being viewed by the user so that the user is provided with the service of viewing the video(s) in a non-occluded manner. When hosted in a cloud environment, browsers are modified to accept applications in the cloud environment for offering and implementing the services of the various embodiments of the invention.

While the foregoing generally describes the present invention and aspects thereof, reference is now made to the drawings for a more detailed description of the various embodiments of the invention. Since mobile device displays are often too small to view and/or accomplish data-intensive high-productivity tasks, the invention provides methods, apparatus and computer program code aspects that extend the visual display of video and/or pictures across monitors or screens of multiple aggregated mobile devices via a network, while at the same time allowing the end user of the invention to modify and/or alter his experience with the aggregation session. These aspects of the invention run, operate, implement, and control the "Hive" application process flow of the invention as described herein.

Figure 1:
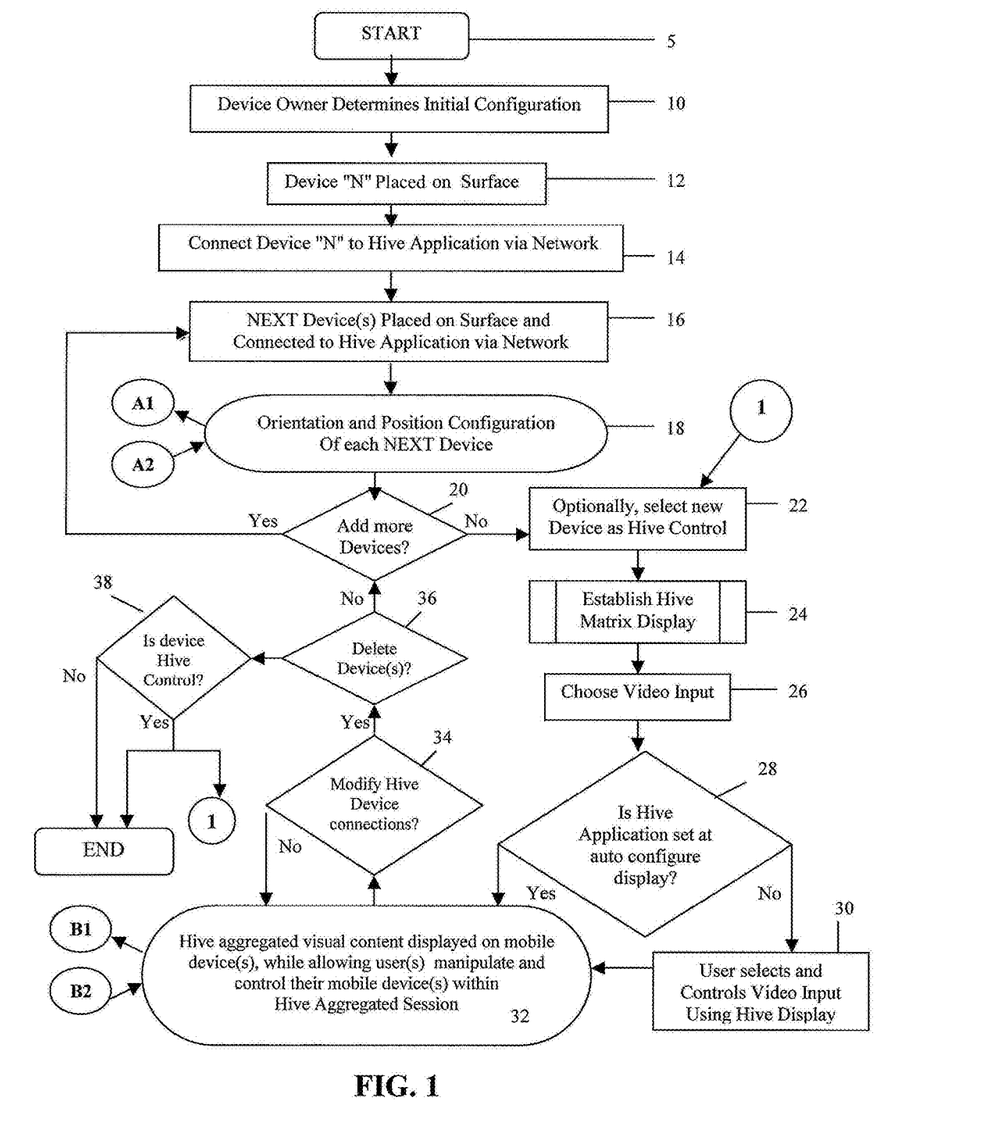
FIGS. 1-3 illustrate flowcharts of exemplary process flows and steps of implementing a virtual Hive aggregation session in accordance with one or more embodiments of the invention.

Referring to FIG. 1, an exemplary process flow of the "Hive" aggregation application of one or more embodiments of the invention is shown. During the process flow of the present Hive application will have various states or stages including, but not limited to, networked, pending, orientation and position, Hive displayed, and control, all of which are discussed further below.

As is shown, the process flow is started (step 5) by providing an end-user mobile device having the instant invention thereon or access thereto (e.g., via cloud computing). For ease of understanding the invention reference is made herein to implementing the instant invention on a mobile computing and/or communication device. However, it should be appreciated by one skilled in the art that the present invention is suitable for use and implementation on any computing device. During the present process flow(s) the Hive application may be within one or more various states or stages including, but not limited to, networked, pending, orientation and position, Hive displayed, and control.

Once the process flow has been started, a first Hive application end-user determines an initial configuration of his mobile device(s) that is to be aggregated within the instant Hive application with other devices and used therein (step 10). In determining the configuration the device owner may decide to position his mobile device horizontally, vertically, at an angle, or combinations thereof. As an alternative or in combination with the end device being configured, the visual content that is to be implemented within the present Hive application may be configured by positioning (horizontally, vertically, or at an angle), resolution, and the like.

The first mobile device(s) is placed on a surface (e.g., a desktop, table, whiteboard, computer monitor, visual display screen, etc.) over visual content residing on the surface that is to be utilized within the instant Hive application (step 12). The visual content may include, but is not limited to, a video (e.g., multimedia content), a picture (e.g., a jpg document, Adobe), text documents (e.g., Word, RTF, PDF, Adobe, and the like, or any combination thereof. In utilizing this visual content, the aggregated Hive mobile devices may enlarge the visual content, magnify (i.e., zoom in on) certain areas of the visual content, and the like, or any combination thereof.

The first mobile device residing over the visual content to be utilized is then connected to the present Hive application via a network (step 14). The network may be any type of known network, including a local area network (LAN) or a wide area network (WAN), connection via an external computer (e.g., through the Internet using an Internet Service Provider), wireless, blue tooth, wired connection, Near Field Communication (NFC) wireless interface, or other networking technology.

Once the first mobile device is connected to the present Hive application, in one or more embodiments signals may be sent out to other nearby mobile devices capable of operating/running the Hive application (e.g., the other devices may have the Hive application residing thereon or being accessible thereto). These signals are to advertise and/or request other devices to join a current Hive aggregation session for participating therein and/or sharing the session responsibilities thereof. The other devices may be within close proximity to the device outputting the signal, or they may remote therefrom whereby the signal is sent and received via the network.

The Hive application then waits for any additional device(s) (i.e., a "Next" device) to be connected to the current Hive aggregation session (step 16). In so doing, one or more additional (Next) devices are placed on the surface having the visual content being used in the current Hive aggregation session, and these devices are then connected to the first device(s) and the aggregation session itself via the network. In certain embodiments, the devices being newly added may bump the other devices already within the Hive aggregation session to automatically join the session (e.g., via Near Field Communication (NFC)).

Once two or more devices are joined to a current Hive aggregation session the devices communicate with each other via the Hive application resources and network to determine and negotiate orientation and placement of each device with respect to each other within the Hive matrix (step 18). This orientation and placement step (step 18) also defines specific portions of the visual content that each Hive device will display and/or enhance, as well as how the visual content is to be displayed within the Hive matrix (e.g., scale, resolution, etc.). In doing so, as an end-user moves his device around and within the Hive aggregation session, over the visual content being reviewed, this orientation and placement positioning of the moving Hive device is continually refreshed and updated within the aggregation session.

In accomplishing these tasks one of the joined Hive devices may be designated as a control Hive device that authorizes, controls and monitors in real-time orientation and placement of all other devices within the Hive aggregation session with respect to each other, and with respect to the control Hive device. In one or more embodiments, the first joined mobile device may be designated as the control Hive device for use during the orientation and position configuration step (steps 18, 40-65) discussed below. The control device may be changed (step 22) during the Hive aggregation session due to disconnection of Hive devices or user preferences.

In accordance with various embodiments, the control device may be assigned by the Hive application, or it may be manually assigned by one or more end-users within the Hive based on user preferences. Also, the Hive control device may be a single device, or a combination of two or more devices working together and sharing each others resources within a current Hive aggregation session. The Hive control device acts as a focal point for all newly added devices joining the hive and all currently existing devices within the Hive matrix. The Hive control device monitors and notifies all other devices within the Hive matrix of when new devices are added or existing devices deleted so that the orientation and configuration of all devices within the current session can be adjusted, reformatted, repositioned and/or reconfigured, etc. to best fit and display the visual content that is being implemented within the session. These steps may be accomplished automatically using the instant Hive logic or manually by end-user(s), as discussed below.

Figure 2:
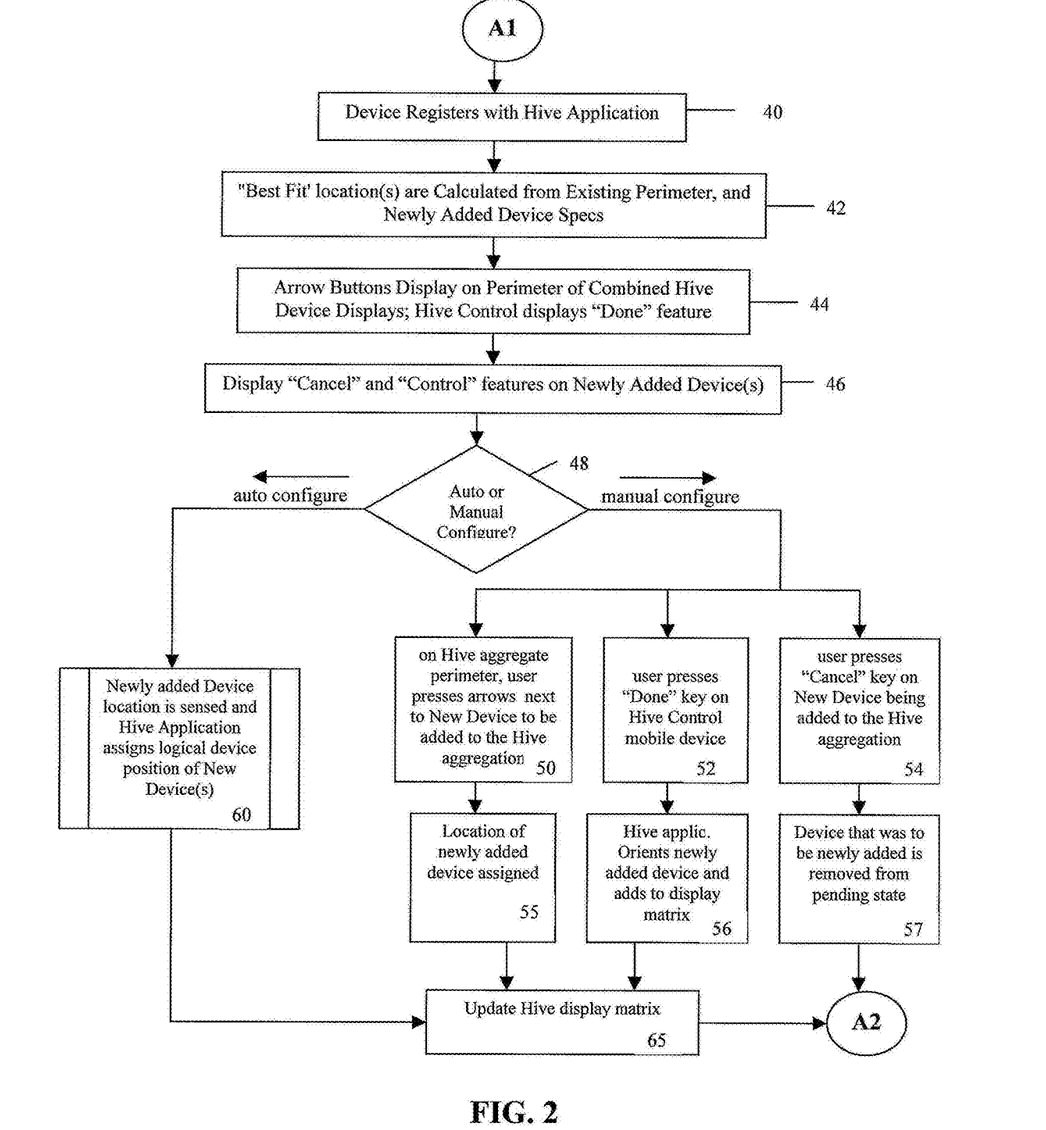

FIG. 2 shows in more detail the orientation and placement configuration step (step 18) of various embodiments of the invention, which sense where newly device(s) is/are in relation to other device(s) already existing within the Hive matrix. Once any new device(s) is placed on the surface having the visual content and added to the current Hive session (step 16), the newly added device(s) is registered with the Hive application session (step 40) in the orientation and position configuration process (step 18). A "Best Fit" location(s) is then calculated using the existing perimeter of the visual content that is to be shared, expanded and/or enhanced amongst the devices within the Hive, in combination with detailed specifications of the added device(s) (e.g., device size, shape, display size and shape, device perimeter dimensions, resolution, etc.) (step 42).

Figure 4A:
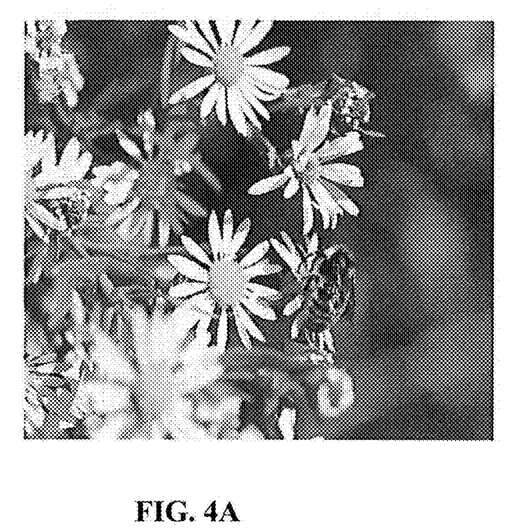
Figure 4B:
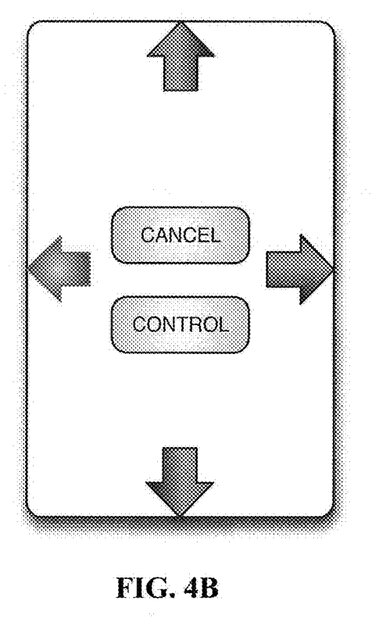
Figure 4C:
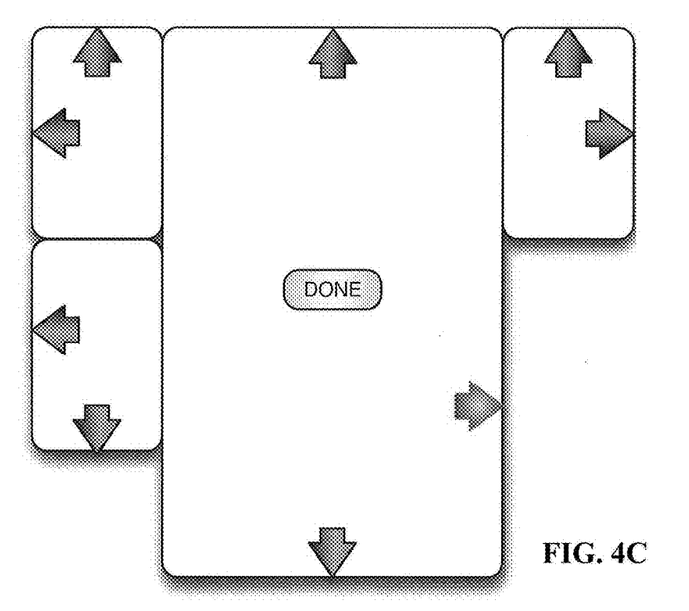

Referring to FIG. 4A, a combined Hive of mobile devices is generated and the perimeter thereof determined (steps 44, 46). In so doing, arrow buttons are provided and displayed on the control device as well as all other devices within the Hive matrix. These arrows may be displayed on all perimeter edges of the devices within the Hive, or alternatively on selected sides of certain devices in the Hive that are allowed to be bumped in accordance with the invention. The control device(s) in the Hive manage and monitor the newly added devices of the Hive. In linking the one or more newly added devices to the aggregated session, these devices are provided with "Cancel" and "Control" keys for enabling the removal, movement (i.e., change in positioning), feature/specification alteration, etc. of the devices within the Hive (step 46). Once all devices are aggregated (i.e., joined) together, at least one of the devices within the aggregation (e.g., the control device) is provided with a "Done" key to indicate the joining of devices is complete at such time (step 44).

The position of each newly added device is then configured within the Hive matrix (step 18). In doing so, the end user determines whether the configuration of his device(s) is to be done automatically or manually (step 48). This configuration step provides some or all devices within the Hive session awareness of where each Hive device is located within the matrix with respect to itself, as well as with respect to the designated control device(s). The newly added devices may be configured automatically (step 60), whereby each new device is sensed within the matrix by the Hive application architecture and software. In one or more embodiments the invention senses the relative location of devices within the hive using one or more sensing devices including, but not limited to, a camera, sonar, accelerometer, NFC, compass, or other proximity/positioning recognition sensors, or any combination of the foregoing. Once sensed, the Hive application assigns a logical positioning placement for the newly added device within the Hive matrix. The matrix is updated (step 65), at which point the process flow continues from the detail the orientation and placement step (step 18).

As an alternative to automatic configuration for newly added devices (steps 60, 65), each newly added device within the matrix may be configured manually by one or more end-users. In accordance with one or more embodiments of the invention the end-user may configure the matrix on the Hive aggregate perimeter (step 50). Each device existing within the Hive session may be provided with arrows at each side or perimeter, whereby the end-user may press an arrow next to the location to where each new device is to be added within the Hive matrix. The location of this newly added device(s) is then assigned within the matrix by the instant Hive application. The matrix is updated (step 65), and the process continues from the detail the orientation and placement step (step 18).

As an alternative, the end-user may manually press a "Done" key on Hive Control mobile device (step 52) when the end-user has predetermined the exact location at which his device is to be added and positioned within the Hive matrix. For example, an end-user may want his mobile device to join to the right of the control device so once his device is positioned and registered within the Hive, the end-user may press the "Done" key on Hive Control since configuration is complete. The Hive application orients and recognizes this new device and adds it to the Hive display matrix (step 56). The matrix is updated (step 65) and the process continues from the detail the orientation and placement step (step 18).

Still as another route for the manual positioning and configuration of various embodiments of the invention, the end-user may press a "Cancel" key on the newly added device (step 54) if the end-user or others decide that the device to be newly added is not desired or needed within the Hive matrix. At this point, the Hive application no longer recognizes the end device, such that, the device that was to be added is no longer in a pending status state and it is no longer registered within the current Hive aggregation session (step 57). The process flow then continues from the detail the orientation and placement step (step 18).

Once a set number of devices are present and joined in the Hive matrix, the visual content to be used in the Hive session, and the matrix display locations and perimeter calculated, it is then determined whether or not any new devices are to be added to the current Hive aggregation session (step 20). If new devices are to be added, the process flow reverts back to the new device(s) being placed on the surface and connected to the Hive (step 16), and the process flow proceeding accordingly. If no further devices are to be added at such time, it is optionally determined whether the session desires or needs one of the devices within the session to be assigned as control device (step). The first joining device assigned initially as the control device may be changed and new device within the session may be designated and provided with the responsibilities of the control device. Alternatively, the control device responsibilities may be split amongst two or more devices within the current Hive session.

The Hive matrix display is then established (step 24), and a video input chosen for the devices within the Hive aggregation session (step 26). That is, how the visual content being examined in the current virtual Hive session is to be displayed on the various devices therein via video input is chosen. It is then determined whether or not the Hive application is set at an automatic configuration of the output display on each device, or a manual output display configuration (step 28). If the end-user must configure the display, the end-user selects and controls the chosen video input (step 30). The process continues to allowing the end-user manipulate and move his device within the current session (steps 32, 70-88). Otherwise, if the Hive application is set at an automatic configuration of the output display, the end device display is automatically configured and the end-user is then allowed to manipulate and move his device within the current session (steps 32, 70-88).

With the mobile devices being connected and configured within the Hive session, end-users are then allowed to manipulate, alter and move their devices within the matrix so that the display of the visual content being viewed becomes a changing virtual display of the content. The content being viewed may be shared amongst and stored within the plurality of devices joined to the aggregation session so that an end-user can move his device around the surface area to display various portions of the content being viewed. In this manner, when visual content is too large to display on a single device it is not only being shared and viewed by the various devices, it is also able to be virtually, continually changeable and viewable by moving the end devices. That is, the devices joined to the instant invention may be moved around on the surface area to display different portions of the visual content that otherwise would not be able to be displayed by one or more of the devices. In so doing, the end devices may or may not contact each other during this virtual movement thereof and manipulation of the visual content being examined.

Figure 3:
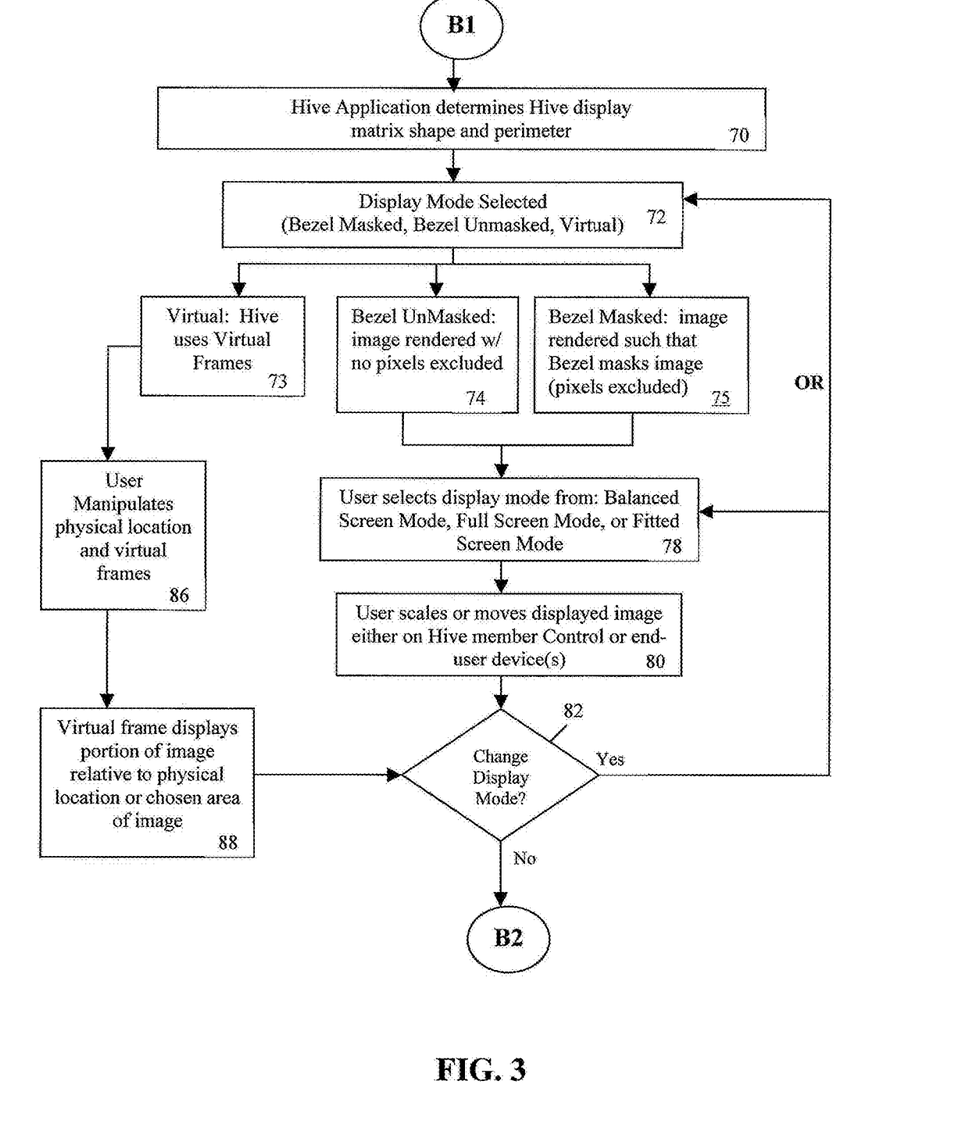

Referring to FIG. 3, the manipulation and control of the devices within the Hive session may include various steps. The instant Hive application may determine the Hive display matrix shape and perimeter (step 70), and then a display mode is selected (step 72). This display mode relates to how the visual content being examined by the invention is to be displayed on the one or more devices connected to the current Hive session. The display modes may include, but are not limited to, a bezel masked display mode, a bezel unmasked display mode, a virtual display mode, and the like.

In instances when the Hive display matrix is to be virtually generated (step 73), the end-user moves and manipulates the physical positioning of his Hive-joined mobile device(s) with its virtual frames (e.g., display screen) (step 86). The virtual frame/display screen of the end user's manipulated and/or moved device displays that portion of the visual content (chosen area of image) corresponding to the physical location where the device now resides (step 88). It is then determined if the display mode is to be changed (step 82). If it is to be changed, then the process flow reverts to the step of selecting a display mode (step 72). If it is not to be changed, then the process continues on from the step of manipulating and controlling the end user device(s) in the overall process flow (step 32).

As an alternative to the automatic virtual display mode, an end user may select the display mode from a bezel unmasked or a bezel masked mode. The bezel is often referred to as the front panel or outside frame surrounding the display monitor of a computing device case (e.g., the front panel of the mobile device). While shapes of current bezels are typically square or rectangular, it should be appreciated by one of skill in the art that any shaped bezel may be used in the various embodiments of the invention. For instance, the bezel shape may be, but is not limited to, circular, oval, triangular, or any other geometric shape. Combinations of these shaped bezels may also be used in a single aggregation session of the invention. It should also be appreciated that the invention is not limited to rigid displays and bezels, but may also be implemented with flexible displays and bezels, as well as even 3-dimensional displays/bezels (e.g., one or more cylindrical displays/bezels, one or more cubed displays/bezels, etc.) The virtual frame within each of these shaped displays/bezels may also be modified to one or more different shapes during an aggregation session of the invention.

Referring again to FIG. 3, if it is desired to display the image on the mobile device with no pixels thereof excluded, then the end user chooses the bezel unmasked display mode (step 74). Once it is decided that no pixels of the visual content being examined are to be excluded, the end user may then choose to either balance the screen mode of the display, view the display in a full screen mode, or fit the screen mode to the display of the mobile device (step 78). The end user may then scale or move the displayed image on one of the joined Hive devices (e.g., on the control device or on the end user's device(s) (step 80). For instance, the user may resize and/or move the displayed image around so that the displayed image (content) thereof changes across the display monitor of the mobile device (e.g., zooming into portions of the image, zooming out to see a larger image, etc.). If the display mode is to be changed the process reverts to the step of selecting a display mode (steps 82, 72). Otherwise, the process flow proceeds from manipulating and controlling device(s) (steps 82, 32).

For instance, in the bezel unmasked mode a mobile device may reside in a location corresponding a portion of the visual content being examined that can not be viewed on the control or other devices within the Hive. Even though the bezel of the mobile device may be smaller in dimension than the portion of the visual content being viewed, the visual content portion is not constrained by the outside perimeter or characteristics (e.g., shape, size, thickness, etc.) of the mobile device's bezel.

In the bezel masked mode the image of the visual content being examined is displayed on the end user device(s), whereby the image is rendered with pixels thereof excluded (step 75). The end user may then choose to balance the screen mode, view in full screen mode, or fit the screen mode (step 78) following by scaling or moving the displayed image (step 80). Again, if the display mode is to be changed the process reverts to the step of selecting a display mode (steps 82, 72). Otherwise, the process flow proceeds from manipulating and controlling device(s) (steps 82, 32).

For instance, in the bezel masked mode edges of the mobile device bezel may be taken into account, such that, the outside dimensions and/or characteristics of the device define that portion of the visual content that can be displayed. Any visual content extending beyond these boundaries are excluded from the display.

Once the end user is no longer manipulating and/or controlling his respective Hive connected mobile device(s), it may then be determined whether or not connections of any device(s) within the Hive is/are to be modified (step 34). If no connections need to be modified, the end users may continue to manipulate and control their devices within the Hive (step 32). If end device connections are to be modified (step 34), it is then determined whether any of the devices connected to the Hive are to be deleted (step 36).

If no devices are to be deleted, it is then determined if Hive device connections are to modified by adding a new device to the current Hive aggregation session (step 20). If a new device is to be added, the process reverts back to the steps of adding a new device and so forth so that the current aggregation session is reconfigured with the newly added device(s) (steps 16, etc.). If a new device is not to be added, the process continues to optionally selected a new device as Hive control and so forth (steps 22, etc.).

In the event it is determined that device(s) within the Hive is/are to be deleted (step 36), it is then determined whether or not any of the devices that are to be deleted are the Hive control device (step 38), If any of the devices that are about to be deleted is/are the Hive control, then the process reverts back to selecting one or more Hive joined devices to act as the Hive control for the current Hive aggregation session (step 22). As an alternative, if the devices are to be deleted are the Hive control, the device may be deleted at which point the entire current Hive aggregation session is ended. Otherwise, if none of the devices to be deleted are the Hive control, the devices may be deleted and the current Hive aggregation session continued for all other Hive connected devices remaining within the session.

Referring to FIGS. 4A-5C, one or more exemplary embodiments are shown in accordance with the invention. As shown in FIG. 4A visual content that is to be implemented with the invention is provided. This visual content may be a one-dimensional depiction, two-dimensional depiction, three-dimensional depiction, video, virtual visual content, real-time visual content, and the like. A computing device, such as a mobile device, is provided on the desktop, and networked to a Hive aggregation session of the invention to allow other computing devices join it within the aggregation session (see, FIG. 4C) to assist in viewing and examining the visual content of FIG. 4A. Devices are joined to the Hive aggregation session, and either automatically assigned a location within the Hive matrix of Fig. C during the orientation and position configuration steps (i.e., steps 18, 40-65), or manually assigned a location with the matrix during these steps. As shown in FIG. 4B the initial starting device may be the Hive Control for the entire session, or it may be changed during the session.

Once the one or more devices are joined to the Hive and the configuration thereof are "Done," how the visual content of FIG. 4A is to be displayed on the multiple monitors of the devices within the session is chosen. The configuration (automatic or manual) thereof is completed, and then the end users are allowed to manipulate, control, alter and/or move their respective devices within a current Hive aggregation matrix so that the viewed visual content becomes is also altered or enhanced to become a changing virtual display thereof.

Figure 5A:
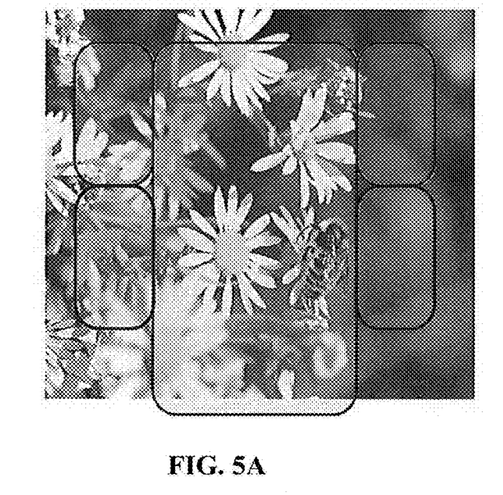
Figure 5B:
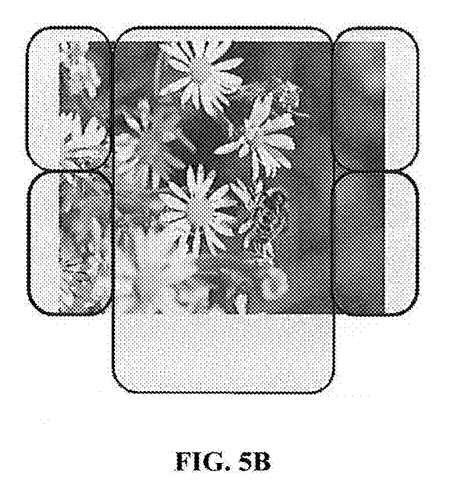
Figure 5C:
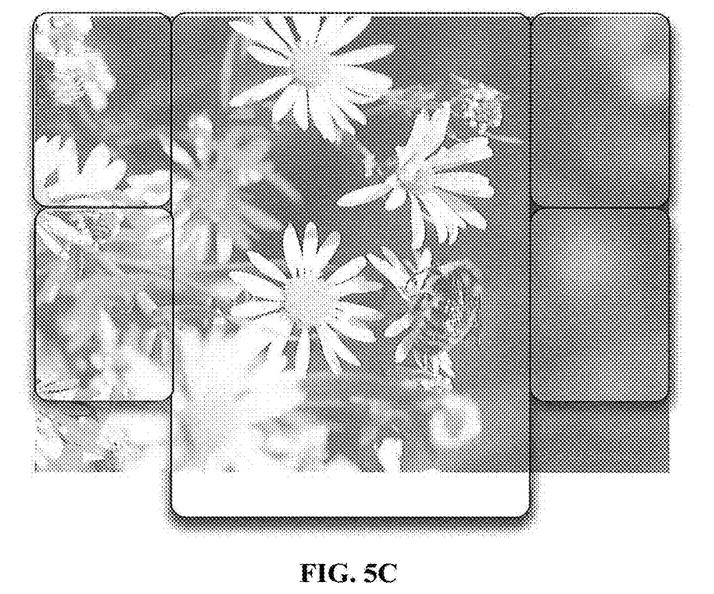

In this altered or enhanced visual depiction of the image being examined, the display mode of the devices is selected (e.g., bezel masked display mode, bezel unmasked display mode, virtual display mode, etc.). Again, each particular mode allows and provides for different features and depictions of the visual content. For instance, a first control perspective is shown in FIG. 5A, and a second control perspective is shown in FIG. 5B. Based upon end user preferences, the combined Hive aggregation matrix may not show a desired portion of the visual content (e.g., FIG. 5A) or it may not show all of the visual content (e.g., FIG. 5B). The end users may then move, control and manipulate (e.g., zoom in/out on selected portion of visual content, move devices over a desired portion of the visual content, enhance the quality and focus of the visual content, etc.) one or more of the combined Hive devices to obtain a desired visual viewing end result of the visual content being examined. For instance, the image of FIG. 5A has been zoomed out (i.e., shrunk or decreased) in FIG. 5C to show more of the image. The positioning of the devices also may have been moved to obtain a better view of the visual content.

Figure 6A:
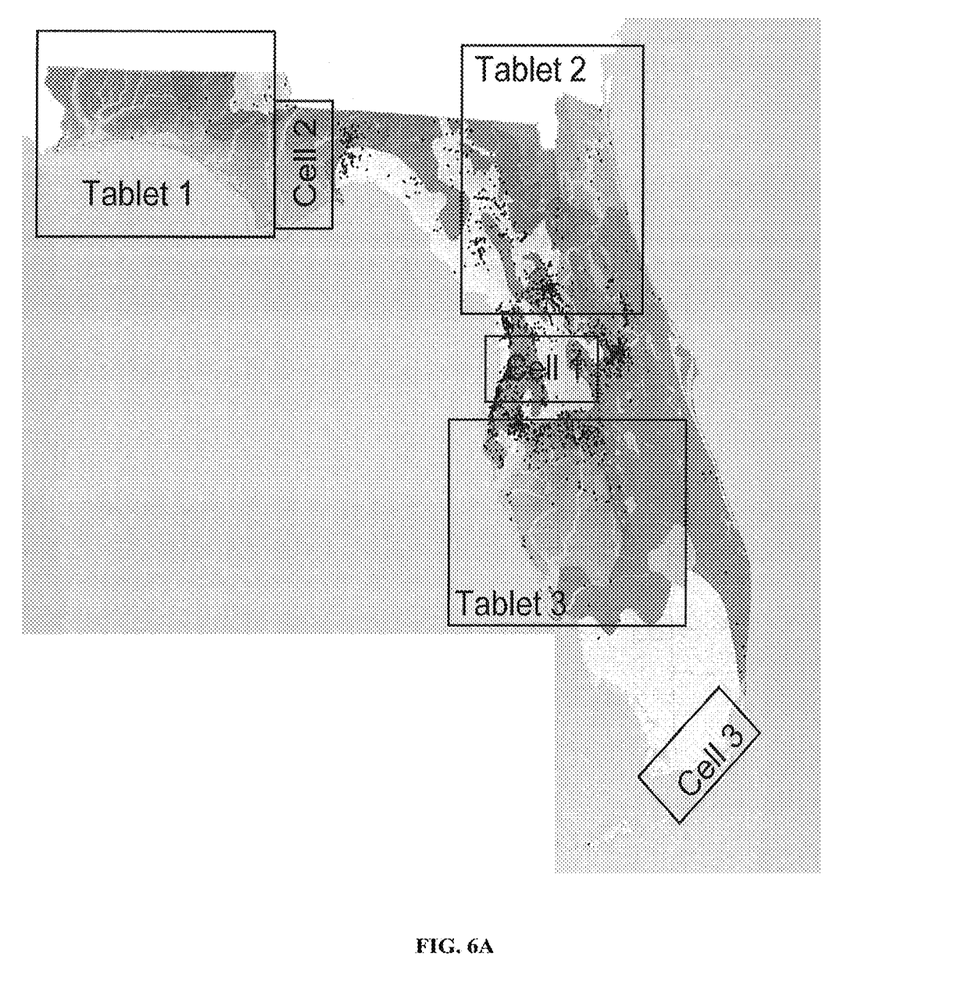
Figure 6B:
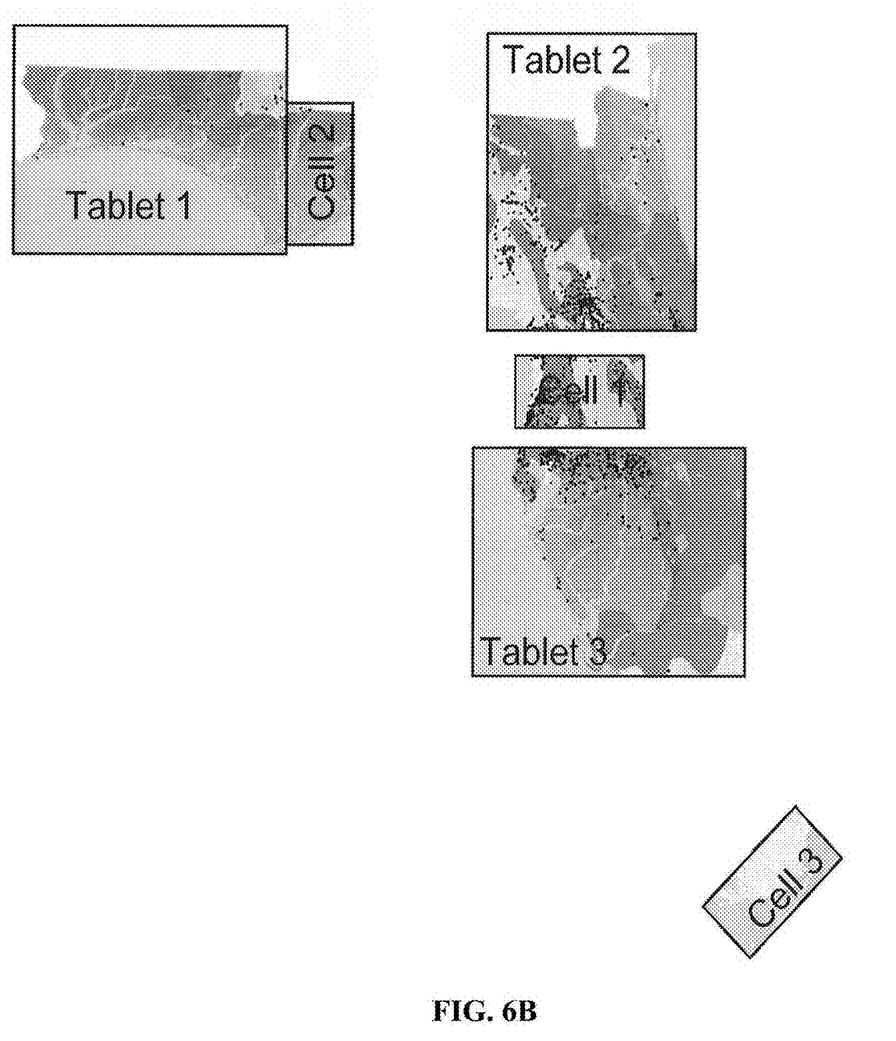
Figure 7A:
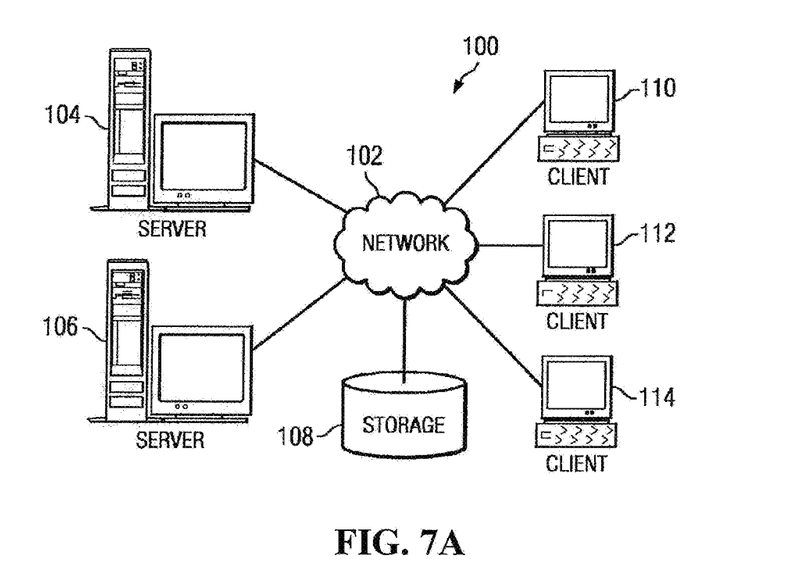
FIG. 7A illustrates a representation of a network of a data processing system which embodiments of the invention may be implemented.
Figure 7B:
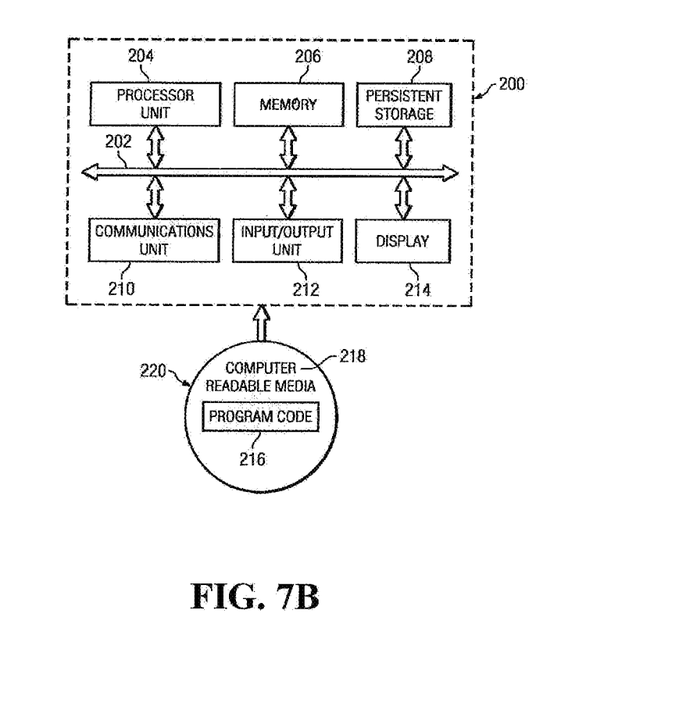
FIG. 7B illustrates a block diagram of a data processing system in which certain embodiments of the invention may be implemented.

FIGS. 6A-6B show other examples in accordance with one or more embodiments of the invention. As is shown, the various embodiments of the invention are not limited to a single type of computing device during the instant Hive aggregation session. It should be appreciated that a variety of different computing devices may be used in combination with each other during a single session. For example, a Hive aggregation session may include one or more mobile devices such as a computing movable device including, but not limited to, a mobile phone, a tablet, an e-reader, a lap top, a computer, a gaming device (e.g., ipod, Nintendo DS, etc.), or any combination thereof. Also different brands of devices (e.g., phone, Motorola, Nintendo, Google Android, etc.) may be used simultaneously within the present invention so long as each device has the Hive application architecture of the invention accessible thereto and/or running thereon.

As shown in FIG. 6A, a number of different types of mobile devices have networked and joined together in a Hive session of the invention. As is shown in FIG. 6A, the Hive joined devices do not need to physically contact each other as they do in the exemplary embodiment of FIGS. 4A-5C. As long as the devices within a single Hive aggregation session of the invention are in logical communication with each other, then the devices are joined and/or connected to each other in the session. That is, the number of different devices within a Hive session making up the matrix thereof need to sense and communication with each other, as well as be able to share each other resources.

FIG. 6A shows an image of the map of Florida as the visual image that is to be implemented, examined, enhance, enlarged, altered, decreased, etc. in accordance with the various embodiments of the invention. FIG. 6B shows a view of the invention that may be seen by the end users. A number of tablets 1, 2, 3 in combination with a number of cell phones 1, 2, 3 are joined together in a Hive aggregation session. Any one or more of these mobile devices may act as the Hive control, which may be changed during the aggregation session for any reason. As shown, the map of Florida is too large to view on any one of the Hive joined devices alone. If it were displayed on a single device, the size thereof would be too small with diminished resolution of key attributes or features within the image that are desired to be viewed. As such, the invention allows for the image to be viewed and shared amongst a number of devices, whereby the devices may be moved around while still being connected to the other devices within the Hive and/or the viewed image altered, in order to view desired areas of the map.

For instance, tablet 1 of FIGS. 6A-B show tablet 1 over the pan handle region of Florida. A second device(s) (cell 2 and/or tablet 2) may join the Hive session by bumping the first tablet 1 (i.e., getting in close physical proximity to the first device so that these devices are in logical and/or physical communication and/or contact with each other. The second device(s) is/are registered with the session and configured therein in relation to the other Hive devices. The orientation of each device within the Hive may be determined automatically by the Hive software, or manually by the end users.

Once the plurality of devices are joined together within the Hive, each device may be moved along the surface adjacent the other devices to view areas of the map with viewing resolution that otherwise would not be viewed by a single device acting alone. As shown in FIGS. 6A-B, the devices may be moved around the surface area in any orientation to the other Hive devices to obtain a desired or acceptable view of the visual content being examined. For instance, the devices may be moved at any angle and orientation in an x-y plane of the surface area. In moving the devices, the devices may be slide around the surface area on which they reside to provide a real-time, dynamic changing view-port or display on these moving device. This 'virtual view-port' (i.e., a view-port that may be continuously changed based on end user preferences and/or actions) is combined with accelerometer-based dead reckoning to provide the moving device with a continually changing view of the visual content being examined. Further, in one or more embodiments the device(s) may have a display in zoom mode, and by sliding the device(s) around within the matrix, it acts as a magnifying glass that enlarges portions of the visual content.

Alternative to sliding Hive devices around on a surface area, the devices may be picked up and removed off the surface area and placed back down in another location thereof for repositioning the device to a different location on the surface and within the Hive matrix. As another alternative, in one or more embodiments a Hive joined device may be removed from the surface area and repositioned over another device joined within the Hive to further enhance the image being viewed on the underlying Hive device. This may be repeated for any number of devices within the Hive session so that a single session may have any number of overlapping Hive devices. Overlying devices may physically contact the underlying devices, or reside a distance apart from these underlying devices.

In still other embodiments the Hive devices may not only move in x-y planes with respect to the x-y plane of the control device and/or of the visual content, they may also move in the z-plane in relation thereto, or even combinations of x-y and z-planes. In doing so, a Hive connected device may be joined to or moved within the Hive matrix at an angled position to allow the end users view a 3-dimensional rendering of the visual content being examined. This 3-dimensional view may be virtual and continuously changeable depending upon where and how the Hive devices are moved to or manipulated within the Hive matrix. For instance, devices positioned at angles with respect to the control device(s) and/or visual content may be physically moved, the features thereof changed (e.g., zoom-in, zoom-out, enhance quality of image, rotate viewed image, etc.), or any other manner in which the devices may be manipulated.

In other embodiments, not only may Hive devices show images as 3-dimensional renderings, they may also display a different view of 2-dimensional visual content (e.g., expand the view thereof, change the perspective thereof, etc.) Again, by moving the Hive devices in a horizontal position, vertical position, or combinations thereof, the end user is allowed to change what is being viewed by all other end users within Hive session. The end user may rotate his device to various angles in x-, y-, and/or z-planes to show different perspectives of the image being examined. Again, all embodiments herein may be done for static visual content (e.g., an image) or virtual visual content (e.g., a video).

In accordance with the various embodiments of the invention devices joined in a Hive matrix display may have inertial or other motion sensing devices that allow the devices to be moved (i.e., slid, picked up and replaced, etc.) to a different position within the Hive, whereby the Hive architecture readjusts to accommodate the new matrix layout. In still other embodiments, a device used in the invention may include a user-facing camera that can sense a sense a repositioning (assuming there is something stable in its field of view) and can be simply slid into a different position and the Hive will adjust to the new layout. When devices in the Hive have proximity sensors that detect the relative position of an adjacent device, they may be re-arranged in a similar ad-hoc manner and would not require a step of indicating to a Hive member where the candidate device was first placed. Still further, when any or all devices in the Hive are enabled to transmit their display to a large external display (e.g., a projector), once the Hive is established each device may be registered therein and converted to Control devices, whereby the Hive display behavior may shift to one or more large external displays, such as for instance, displays on a laptop computer, desktop computer, attached projection device, digital projection device, heads-up "displays", projector, etc. Also, devices having motion sensing capabilities may make that transition automatically (e.g., with a Cancel option to simply drop out of the network).

Exemplary diagrams of data processing environments are shown in FIGS. 3A-B in which embodiments of the invention may be implemented. It should be appreciated and understood that these drawings are only exemplary and are not intended to assert or imply any limitation with regard to the environments in which different embodiments may be implemented. Many modifications to the depicted environments may be made.

A representation of a network of data processing systems in which embodiments of the invention may be implemented are shown in FIG. 3A. Network data processing system 100 may be a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 (e.g., personal computers or network computers) connect to network 102. The servers may provide data, such as boot files, operating system images, and applications to clients 110, 112, and 114. Network data processing system 100 may include additional servers, clients, and other devices not shown. The program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

Network data processing system 100 may be the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN), or within a cloud computing environment. Again, these figures are meant to be examples and not as an architectural limitation for the different illustrative embodiments.

The block diagram of FIG. 3B illustrates a data processing system of certain embodiments of the invention. The data processing system 200 is an example of a computer, such as server 104 or client 110 in FIG. 3A, in which computer usable program code or instructions implementing the processes may be located. The data processing system 200 may include communications fabric 202, which provides communications between processor unit 204, memory 206, persistent storage 208, communications unit 210, input/output (I/O) unit 212, and display 214.

A central processing unit (CPU) 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210 provides for communications with other data processing systems or devices. In these examples, communications unit 210 may be a network interface card. Communications unit 210 may provide communications through the use of either or both physical and wireless communications links. Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 may be located in a functional form on computer readable media 218 that is selectively removable and may be loaded onto or transferred to data processing system 200 for execution by processor unit 204. Program code 216 (i.e., instructions) and computer readable media 218 form computer program product 220 in these examples. The computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

Again, these examples of the data processing system 200 are not meant to be limiting. Rather, the data processing system 200 may be implemented in various forms. For example, data processing system 200 may be a computer, a workstation, a laptop computer, a mobile phone, a personal digital assistant, or some other suitable type of data processing system. The various embodiments of the invention be implemented using any hardware device or system capable of executing program code.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for creating a virtual extended display on mobile devices, said method comprising:
    joining a first mobile device to an aggregation session in response to the first mobile device having been placed on, and in direct physical contact with, a surface positioned over visual content;
    designating the first mobile device as a control device that authorizes, controls and monitors, in real-time, orientation and placement of all other mobile devices within the aggregation session with respect to each other, and with respect to the control device;
    sending a request signal to other mobile devices capable of being joined to the aggregation session, said request signal requesting the other mobile devices to join the aggregation session;
    after said sending the request signal, automatically joining a second mobile device to the aggregation session in response to the second mobile device having been placed on, and in direct physical contact with, the surface and having bumped the first mobile device, said joining the second mobile device to the aggregation session encompassing the second mobile device being oriented and placed, by the control device, on the surface relative to the first mobile device and being connected to the first mobile device;
    after said joining the second mobile device to the aggregation session, automatically joining a third mobile device to the aggregation session in response to the third mobile device having been placed on, and in direct physical contact with, the surface and having bumped the first mobile device and the second mobile device, said joining the third mobile device to the aggregation session encompassing the third mobile device being oriented and placed, by the control device, on the surface relative to the first and second mobile devices and being connected to the first and second mobile devices device, said joining the third mobile device to the aggregation session further encompassing the second mobile device being notified by the control device that the third mobile device has joined the aggregation session; and
    providing the control device with a Done key to indicate that the joining of multiple mobile devices to the aggregation session is complete,
    wherein the multiple mobile devices comprise the first mobile device, the second mobile device, and the third mobile device,
    wherein the visual content is split within the aggregation session into a respective portion on each mobile device of the multiple mobile devices,
    wherein each mobile device of the multiple mobile devices can been moved and manipulated, during the aggregation session, on the surface by a respective user specific to each mobile device to virtually alter the viewed output display of the visual content on each mobile devices.

2. The method of claim 1, wherein the first mobile device or the second mobile device has been moved and manipulated, during the aggregation session by a first user or a second user who is the respective user specific to the first mobile device or the second mobile device, to zoom-in and zoom-out of the visual content displayed on the first or the second mobile device, respectively.

3. The method of claim 1, wherein the visual content is stored within the first or second mobile device and shared with the third mobile device not having the visual content stored therein.

4. The method of claim 1, wherein the visual content is selected from the group consisting of an image, a video, a 1- or 2- or 3-dimensional object, a data file and a text document.

5. The method of claim 1, wherein the first and second mobile devices physically contact each other during at least a portion of the aggregation session.

6. The method of claim 1, wherein the surface area is selected from the group consisting of a desktop, table, whiteboard, computer monitor, and visual display screen.

7. The method of claim 1 wherein the first mobile device or the second mobile device has been moved and manipulated, during the aggregation session by a first user or a second user who is the respective user specific to the first mobile device or the second mobile device, to control and change viewing features that enhance quality and focus of the visual content on the first mobile device or the second mobile device, respectively being manipulated.

8. The method of claim 7, wherein viewing features changed on the first mobile device or the second mobile device are selected from the group consisting of image resolution, image scale, pixelation, magnification, shrinkage, image positioning, screen positioning, screen orientation, and image orientation.

9. The method of claim 1, wherein the first mobile device or the second mobile device has been moved, during the aggregation session by a first user or a second user who is the respective user specific to the first mobile device or the second mobile device, to control and change to a different physical location within a matrix of the aggregation session to provide a different viewed output display of the visual content on the first mobile device or the second mobile device, respectively.

10. The method of claim 1, said method further comprising:
deleting additional mobile devices from the aggregation session; and
in response to said deleting additional mobile devices, reconfiguring the viewed output display of the visual content based on all mobile devices then existing within the aggregation session.

11. The method of claim 1, said method further comprising:
after said joining the second mobile device to the aggregation session, designating the second mobile device as another control device so that the first and second mobile devices work together as a joint control device that authorizes, controls and monitors, in real-time, orientation and placement of all other mobile devices within the aggregation session with respect to each other, and with respect to the joint control device.

12. A computer program product, comprising a computer readable hardware storage device having computer readable program code stored therein, said program code containing instructions executable by a processor of a computer system to implement a method for creating a virtual extended display on mobile devices, said method comprising:
joining a first mobile device to an aggregation session in response to the first mobile device having been placed on, and in direct physical contact with, a surface positioned over visual content;
designating the first mobile device as a control device that authorizes, controls and monitors, in real-time, orientation and placement of all other mobile devices within the aggregation session with respect to each other, and with respect to the control device;
sending a request signal to other mobile devices capable of being joined to the aggregation session, said request signal requesting the other mobile devices to join the aggregation session;
after said sending the request signal, automatically joining a second mobile device to the aggregation session in response to the second mobile device having been placed on, and in direct physical contact with, the surface and having bumped the first mobile device, said joining the second mobile device to the aggregation session encompassing the second mobile device being oriented and placed, by the control device, on the surface relative to the first mobile device and being connected to the first mobile device;
after said joining the second mobile device to the aggregation session, automatically joining a third mobile device to the aggregation session in response to the third mobile device having been placed on, and in direct physical contact with, the surface and having bumped the first mobile device and the second mobile device, said joining the third mobile device to the aggregation session encompassing the third mobile device being oriented and placed, by the control device, on the surface relative to the first and second mobile devices and being connected to the first and second mobile devices device, said joining the third mobile device to the aggregation session further encompassing the second mobile device being notified by the control device that the third mobile device has joined the aggregation session; and
providing the control device with a Done key to indicate that the joining of multiple mobile devices to the aggregation session is complete,
wherein the multiple mobile devices comprise the first mobile device, the second mobile device, and the third mobile device,
wherein the visual content is split within the aggregation session into a respective portion on each mobile device of the multiple mobile devices,
wherein each mobile device of the multiple mobile devices can been moved and manipulated, during the aggregation session, on the surface by a respective user specific to each mobile device to virtually alter the viewed output display of the visual content on each mobile devices.

13. The computer program product of claim 12, wherein the first mobile device or the second mobile device has been moved and manipulated, during the aggregation session by a first user or a second user who is the respective user specific to the first mobile device or the second mobile device, to zoom-in and zoom-out of the visual content displayed on the first or the second mobile device, respectively.

14. The computer program product of claim 12, wherein the visual content is stored within the first or second mobile device and shared with the third mobile device not having the visual content stored therein.

15. The computer program product of claim 12, wherein the visual content is selected from the group consisting of an image, a video, a 1- or 2- or 3-dimensional object, a data file and a text document.

16. A computer system, comprising a processor, a memory coupled to the processor, and a computer readable hardware storage device coupled to the processor, said storage device containing program code executable by the processor via the memory to implement a method for creating a virtual extended display on mobile devices, said method comprising:
joining a first mobile device to an aggregation session in response to the first mobile device having been placed on, and in direct physical contact with, a surface positioned over visual content;
designating the first mobile device as a control device that authorizes, controls and monitors, in real-time, orientation and placement of all other mobile devices within the aggregation session with respect to each other, and with respect to the control device;
sending a request signal to other mobile devices capable of being joined to the aggregation session, said request signal requesting the other mobile devices to join the aggregation session;
after said sending the request signal, automatically joining a second mobile device to the aggregation session in response to the second mobile device having been placed on, and in direct physical contact with, the surface and having bumped the first mobile device, said joining the second mobile device to the aggregation session encompassing the second mobile device being oriented and placed, by the control device, on the surface relative to the first mobile device and being connected to the first mobile device;
after said joining the second mobile device to the aggregation session, automatically joining a third mobile device to the aggregation session in response to the third mobile device having been placed on, and in direct physical contact with, the surface and having bumped the first mobile device and the second mobile device, said joining the third mobile device to the aggregation session encompassing the third mobile device being oriented and placed, by the control device, on the surface relative to the first and second mobile devices and being connected to the first and second mobile devices device, said joining the third mobile device to the aggregation session further encompassing the second mobile device being notified by the control device that the third mobile device has joined the aggregation session; and providing the control device with a Done key to indicate that the joining of multiple mobile devices to the aggregation session is complete, wherein the multiple mobile devices comprise the first mobile device, the second mobile device, and the third mobile device, wherein the visual content is split within the aggregation session into a respective portion on each mobile device of the multiple mobile devices, wherein each mobile device of the multiple mobile devices can been moved and manipulated, during the aggregation session, on the surface by a respective user specific to each mobile device to virtually alter the viewed output display of the visual content on each mobile devices.

17. The computer system of claim 16, wherein the first mobile device or the second mobile device has been moved and manipulated, during the aggregation session by a first user or a second user who is the respective user specific to the first mobile device or the second mobile device, to zoom-in and zoom-out of the visual content displayed on the first or the second mobile device, respectively.

18. The computer system of claim 16, wherein the visual content is stored within the first or second mobile device and shared with the third mobile device not having the visual content stored therein.

19. The computer system of claim 16, wherein the visual content is selected from the group consisting of an image, a video, a 1- or 2- or 3-dimensional object, a data file and a text document.

* * * * *